May 12, 1959 A. R. LUCAS 2,886,808

VOLUME CONTROL UNIT FOR TELEPHONE RINGER

Filed Feb. 11, 1954 4 Sheets-Sheet 1

INVENTOR.

Alfred R. Lucas,

BY Brown, Jackson, Boettcher & Dienner

Attys.

VOLUME CONTROL UNIT FOR TELEPHONE RINGER

Filed Feb. 11, 1954 4 Sheets-Sheet 2

INVENTOR.
Alfred R. Lucas,
BY Brown, Jackson,
Boettcher & Dienner
attys.

May 12, 1959 A. R. LUCAS 2,886,808

VOLUME CONTROL UNIT FOR TELEPHONE RINGER

Filed Feb. 11, 1954 4 Sheets-Sheet 3

INVENTOR.
Alfred R. Lucas,
BY Brown, Jackson,
Boettcher + Dienner
attys.

VOLUME CONTROL UNIT FOR TELEPHONE RINGER

Filed Feb. 11, 1954

INVENTOR.
Alfred R. Lucas,
BY Brown, Jackson,
Boettcher & Dienner
Attys.

United States Patent Office 2,886,808

Patented May 12, 1959

2,886,808

VOLUME CONTROL UNIT FOR TELEPHONE RINGER

Alfred R. Lucas, Galion, Ohio, assignor to North Electric Company, a corporation of Ohio Application February 11, 1954, Serial No. 409,709

3 Claims. (Cl. 340—397)

The present invention relates to a volume control for use with a telephone substation ringer.

Provision of a more compact and a lighter telephone substation set for use in the home has been a constant goal of the telephony field, and considerable development of the components in the telephone sets has been undertaken in recent years in an attempt to accomplish such object. In that the ringer unit of a substation set is the larger and weightier of the components in a telephone set, various stages of the development work have been directed to the provision of a lighter and more compact type ringer structure. A ringer unit which is adapted to be included in a telephone substation set in a minimum of space and at a minimum of cost has been set forth in my copending application which was filed June 30, 1953, which received Serial No. 365,025, and which was assigned to the assignee of this invention.

The novel ringer structure of that disclosure is adaptable for use in the harmonic type, straight line type and superimposed type signalling systems without requiring major structural modifications. The ringer is so designed as to permit assembly and adjustment of the units for these various applications with a minimum amount of skill in a minimum amount of time. These and other advantages and features are inherent in the novel ringer unit and offer a solution to many of the prior art problems.

It is the object of the present invention to provide a novel volume control unit of increased sensitivity which permits adjustment of the volume of a ringer over a wider range, and which is economical in cost. It will be obvious to those skilled in the art that the novel concepts employed in the provision of this improved volume control are not limited to any one ringer structure.

The volume control unit of the present disclosure is particularly adapted for use in the adjustment of the volume of a ringer which utilizes both an electromagnetic field and a permanent magnetic field in the provision of ringing signals. A feature of the arrangement is the manner in which the volume control is operative to vary the effect of the electromagnetic field in given increments, and to simultaneously vary the effect of the permanent magnetic field on the volume output of the ringer. Thus, a more sensitive volume control arrangement is achieved and a wider selection of output signal volume is obtainable.

It should be understood that volume control by varying the effect of the permanent magnet flux singly is feasible, even though a combination of electromagnetic and permanent magnet shunting methods are shown herein.

The use of volume control means to shunt the electromagnetic flux signals alone is set forth in the aforeidentified copending application.

These and other features of the invention will become apparent with reference to the following specification and claims when considered in relation to the accompanying drawings, in which:

Figures 4, 5, 6, 7, 8:
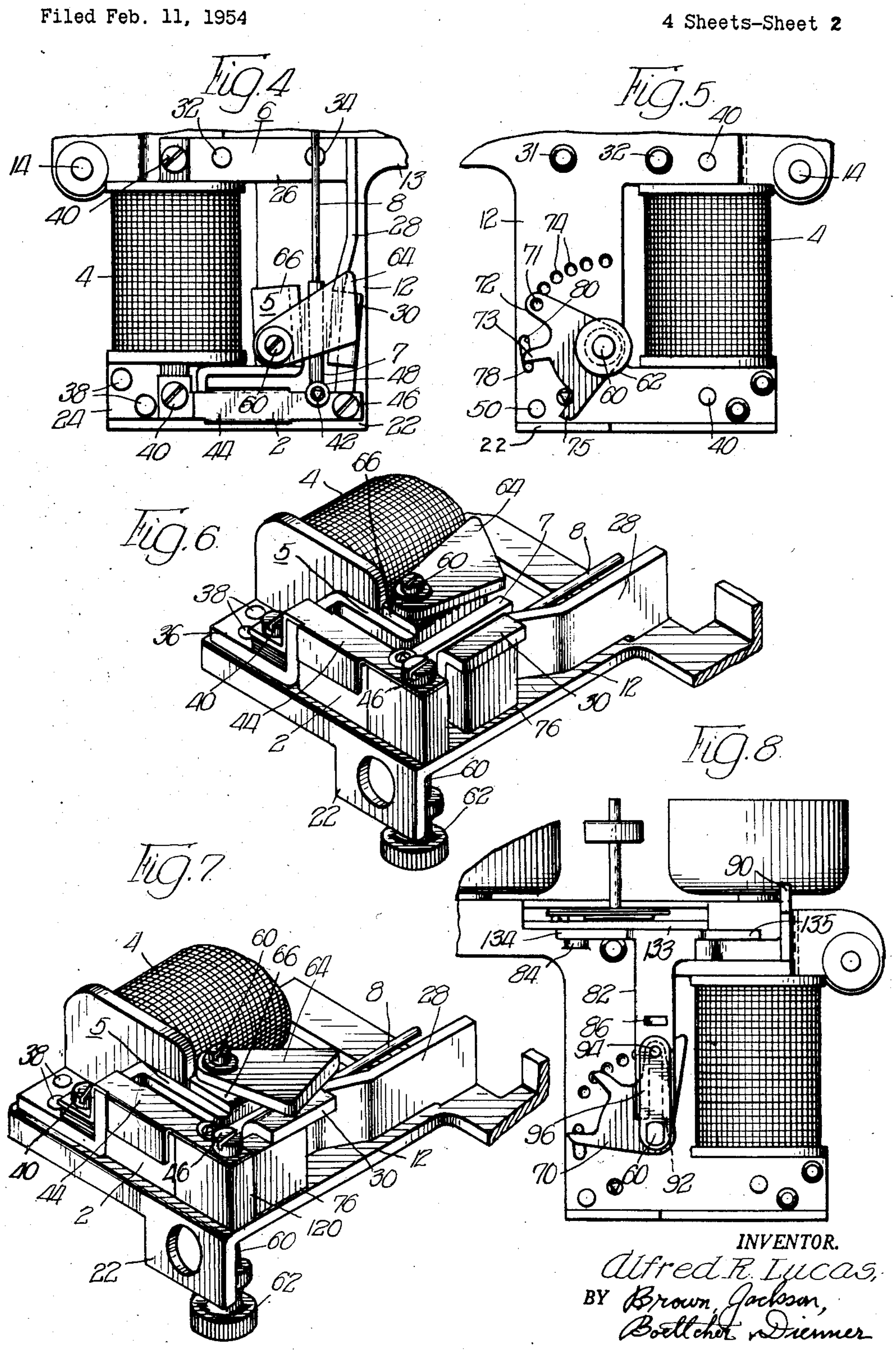
Figures 4 and 5 are front and read views respectively of the ringer shown in Figure 1 with the volume control members operated to effect a minimum sound output for the ringer.
Figure 6 is a perspective view of the ringer of Figure 1 showing the volume control members adjusted to provide maximum sound output.
Figure 7 is a perspective view as in Figure 6, illustrating the volume control members adjusted to effect minimum sound output for the ringer member.
Figure 8 is a rear view of a ringer, including linkage mechanism for effecting an adjustment of the volume control members by a rectilinear movement of the volume control handle.
Figures 9, 10:
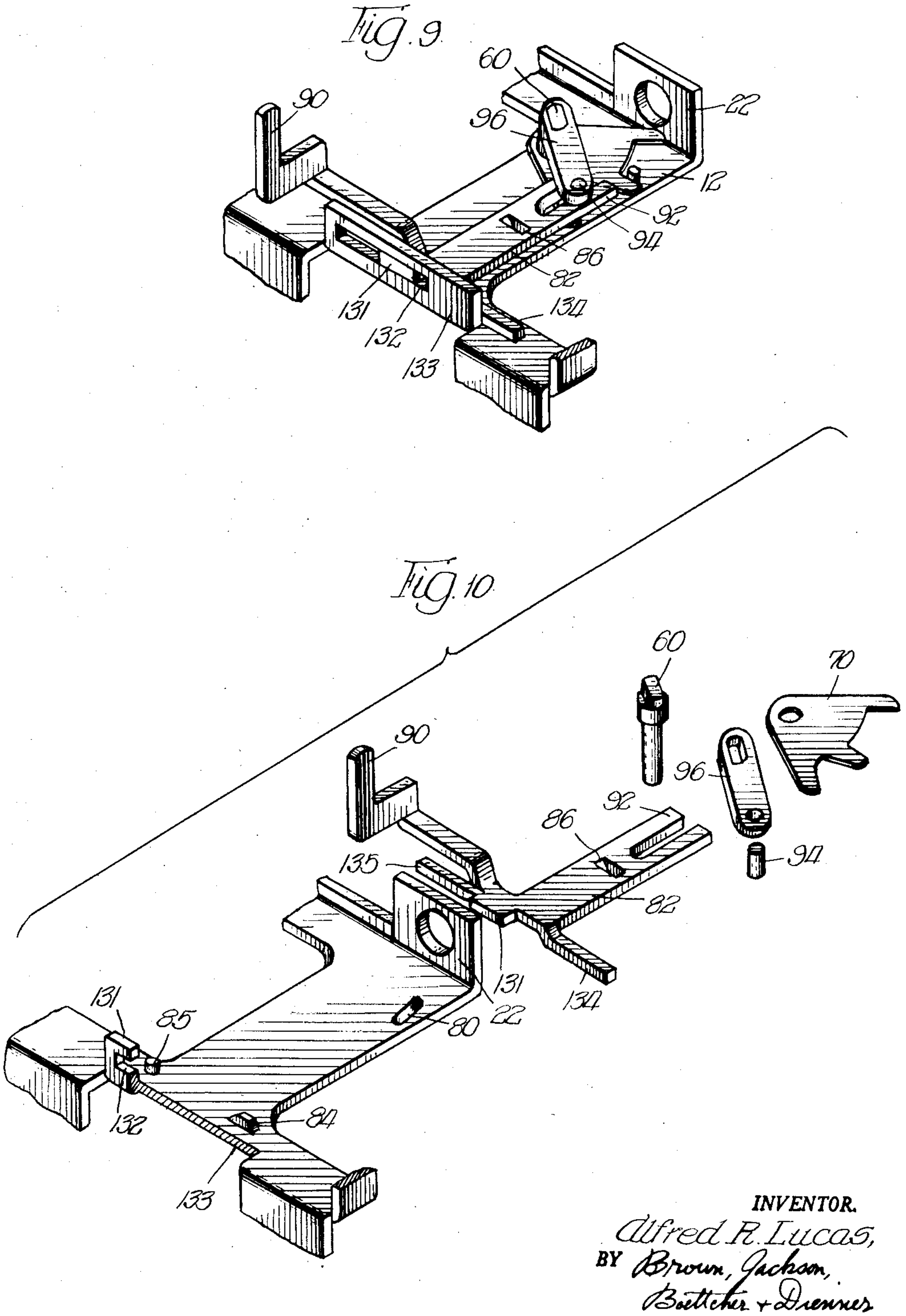
Figure 11:
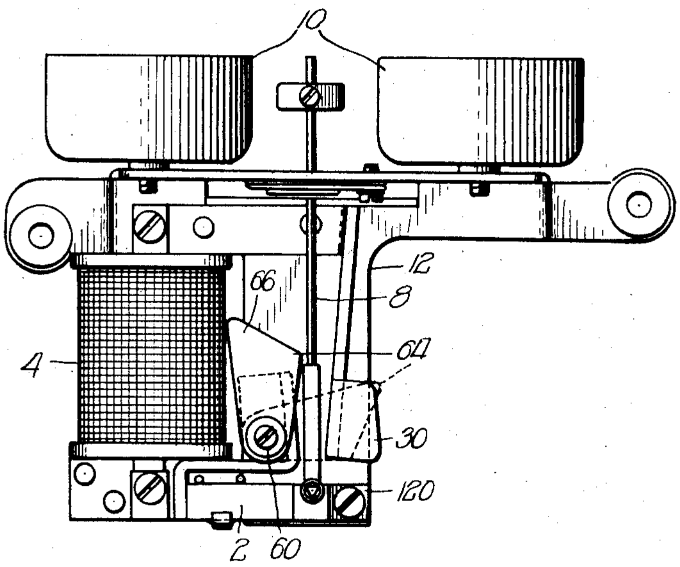
Figure 12:
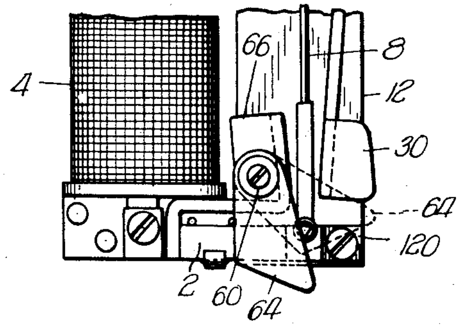
Figure 13:
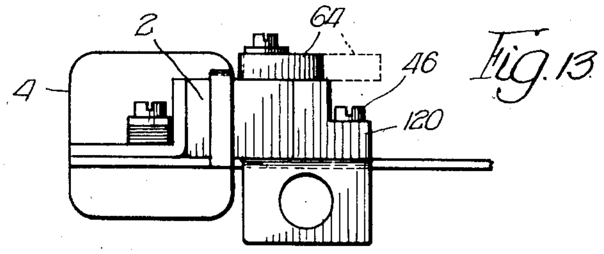

Figures 9 and 10 set forth in a perspective view and an exploded perspective view the linkage arrangement of the ringer of Figure 8; and Figures 11, 12 and 13 are front and bottom views of a ringer having a volume control unit comprised of a single shunt member.

*General description*

The volume control unit of the invention is illustrated in conjunction with the ringer of the prior disclosure, which invention as shown in the various figures, basically comprises a frame member 1, a permanent magnet 2 (or a direct current electromagnet, etc.), a core member 3, a coil member 4 which encompasses the core 3, and which is arranged to be connected to an external source of energization; and a first and a second pole-piece member 5 and 6 respectively, which have their opposite ends mutually disposed to form an air gap therebetween. Both the pole-pieces 5 and 6 are supported so as to be polarized by a common pole or a like pole of permanent magnet 2. Each ringer unit further includes an armature 7 pivotally mounted in a groove in the pole piece extension 120, a reed 8 which is supported on one end of the armature for movement thereby; a conical-helical or spiral spring 9, the center of which is frictionally attached within a circumferential groove of collet 52 which is in turn fixedly attached to the reed 8 and the outside of which is fixedly fastened to the frame 1 by means of the screw 54; a pair of gongs 10 fastened eccentrically to the frame 1; and a clapper 11 mounted on the reed between the gongs for slidable adjustment along the length of the reed.

The armature member 7 is mounted in direct contact with the pole-piece extension 120 abutting permanent magnet member 2, whereby an extremely efficient polarizing path is provided for the operating elements of the ringer structure.

The frame member 1 is basically comprised of a T-shaped member having a central portion 12 and a cross arm 13. Apertures 14 and 16 are located at the extremities of the cross arm 13 to permit ready fastening of the frame to the base of a substation set. A table or support member 20 extends perpendicularly forward of the frame to provide suitable mounting space for the gong members 10. An extension at the bottom of the frame extends perpendicularly rearward to form a further support tab 22 (Figure 6) which is utilized to effect further support of the ringer unit.

A laterally extending portion at the base of the T-frame forms, with the cross arm 13, a U-shaped receiving section for the coil 4.

A first pole-piece 6 includes a support arm 26, and integral therewith, an arm portion 28 which extends vertically downward for approximately one-half its length, and which is thereafter angled to provide an armature facing surface. A flange 30 is bent perpendicular to the armature facing surface of pole-piece 6, pole-piece 6 being secured to the frame 1 by means of rivet members 32 and 34 respectively.

Figure 1:
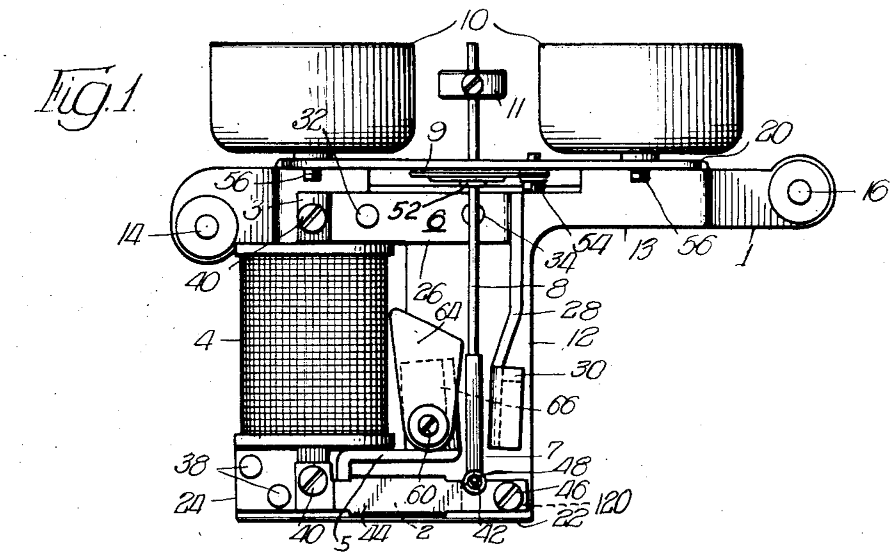
Figure 1 is a front view of the telephone ringer embodying the electromagnetic and permanent magnet shunt of the invention with the volume control members adjusted to provide maximum sound output.

A second pole-piece member 5 comprises a support arm 36 and an integral Z-shaped section, the pole-piece being mounted with the base of the Z in opposed, spaced relation relative to the armature facing surface of the first pole-piece member. The armature facing surfaces of the respective pole-pieces are so formed that with securing of the pole-pieces to the frame, the armature facing surfaces are angularly disposed relative to the vertical, and form a V-shaped air gap as shown in Figure 1. The inward end of the pole-piece 5 is attached to the frame member 1 by suitable fastening means, such as rivets 38.

Screw means 40, which extend through apertures in laminated core 3 and registering apertures in pole-piece members 5 and 6, fasten the laminated core 3 to the frame 1 and also fasten the core 3 in operative relation with the pole-pieces.

Core member 3 supports the coil member 4 which comprises a series of windings of fine copper wire wound about a "Bakelite" core or spool, variously specified coils being used in accordance with the nature of the installation.

The pole-piece extension of the polarizing magnet 2 in the present embodiment includes a V-shaped slot 42 on the upper face thereof, the slot extending across the width of the upper face and in alignment with the base of the V-shaped groove formed by the opposed sections of the pole-piece members 5 and 6. Permanent magnet 2 is fixedly positioned at the base of the frame 1 by means of a keeper member 44 and suitable fastening means, such as illustrated at 40 and 46. It will be apparent with reference to Figure 6, that as the magnet 2 is attached to the frame with one end of the magnet abutting a portion of the pole-piece member 5, the V-shaped groove 42 in pole-piece extension 120 will be in operative alignment with the V-shaped gap formed by the armature facing surface of the pole-pieces 5 and 6 respectively.

Armature member 7 comprises a solid rectangular member of magnetic iron having a V-shaped pivot portion at the lower end thereof, which in turn has a round edge of slightly smaller radius than that of the receiving groove 42 in the pole-piece extension of magnet 2. Furthermore, the angle of groove 42 is slightly larger than the angle of the pivot portion of the armature. The lower pivot end of armature 7 extends laterally beyond the sides of its upper portion for cooperation with aligned aperture 48 in the keeper member, and aligned aperture 50 in the frame 1 (Figure 2), whereby the armature is secured against displacement. With the pivot edge of the armature 7 located in groove 42 of the pole-piece extension of magnet 2, the upper portion of the armature will be located between the armature facing surfaces of the pole-pieces 5 and 6 respectively.

Reed member 8 is secured to the upper end of armature 7, and at its extreme upper end carries the slidable clapper member 11.

A collet member 52 having a circumferential groove about its outer perimeter is secured to the reed sufficiently below the level of the frame platform 20 to prevent the coils of the spiral spring from binding on the platform 20. The outer end of the spring is battened to the under side of the platform 20 by means of suitable fastening means such as 54, which cooperates with an aperture in the platform 20. The frictional attachment between the inner end of the spring 9 and the circumferential groove of the collet member 52 is sufficient to maintain the spring in attached relation with the reed member. As taught in the copending application, it has been found that the outer end of the spring should be battened at a point which is approximately 45° from the transverse line A—A which extends along the line of travel of the reed and through the center of the spring. An alternative arrangement for mounting of the spring is also set forth therein.

A pair of gongs 10 are secured eccentrically to the platform 20 with their open ends facing away from the frame platform 20, and are attached thereto by screw means indicated generally at 56. Securing of the gongs 10 to the platform may be varied in accordance with the type of signalling system with which the ringing unit is to be utilized.

In operation, with the application of a ringing signal to the coil 4 of the ringer, the armature 7 is operated alternatively between its positions adjacent the V-forming surfaces of the pole-pieces 5 and 6 respectively. The reed 8 and the attached clapper member 11 are vibrated with the movement of the armature so that the clapper member 11 strikes gongs 10 alternately to produce a sound signal.

Each time the reed is moved from its normal position, the coils of the conical-helical or spiral spring 9 are compressed, whereby a biasing force is created, which tends to restore the reed 8 to its normal rest position.

The magnetic circuits for effecting operation of the armature are set forth in detail in the copending application. Briefly, with the north pole of magnet 2 abutting lower pole-piece 5 and the south pole of magnet 2 abutting the pole-piece extension 120 containing groove 42, permanent magnet flux circuits for polarizing the pole-pieces may be traced as follows: Considering the left end of magnet 2 as the north pole, flux passes through pole-piece 5 and divides, a portion of the flux following one path through core 3 to pole-piece 6 and thence across the right air gap to armature 7, through the pivot end thereof to groove 42 of pole-piece extension 120, and thence to the south pole of magnet 2, against which it abuts. A second portion of the flux follows a path through pole-piece 5, then across the left air gap to armature 7, through armature 7 to groove 42 of pole-piece extension 120, returning to the south pole of magnet 2 via pole-piece extension 120.

With energization of coil 4 by ringing current, and specifically by the half-cycle period of current wherein the lower end of the core is magnetized as a north pole, flux from the north pole traverses the lower pole-piece 5 to the armature facing surface thereof, across the intervening gap to the armature 7, and across the intervening gap to the armature facing surface of right pole-piece 6, and arms 28 and 26 of pole-piece 6 to the south end of the core 3. The permanent magnet flux and the ringing current flux at this time are additive in the air gap between the lower pole-piece 5 and the armature 7; and are in opposition in the air gap between the armature 7 and the upper pole-piece 6. Accordingly, the armature is rotated counterclockwise (looking at Figure 1) to move the clapper 11 against the left hand gong of the pair 10, whereby the coils of the spiral spring 9 are compressed.

During the alternate half cycle of the ringing current flux, the upper end of the core is north in polarity, and the lower end of the core is south in polarity. In such event, the flux from the north pole traverses the upper pole-piece segments 26 and 28, and the armature facing surface of pole-piece 6, over the intervening air gap to armature 7, and the second intervening air gap to the armature facing portion of pole-piece 5, and thence to the lower or south pole end of the core 3. During this alternate half-cycle, the permanent magnet flux and the ringing current flux are additive in the air gap between armature 7 and upper pole-piece 6, and are in opposition in the air gap between armature 7 and the lower pole-piece 5.

Accordingly, the armature is rotated clockwise, as shown in Figure 1, to move clapper 11 against the right hand gong of the pair 10 whereby the coils of the spiral spring 9 are compressed.

As the reversal in cycles is effected in this manner, the armature 7 is moved from its mid or center position responsive to the application of the flux, and the spring 9 which becomes compressed tends to return the armature 7 to its mid or center position to thereby provide, in conjunction with the magnetic forces, a vibratory movement of the armature. It is apparent from the foregoing that the operation of the armature is influenced by the application of both an electromagnetic flux force and a permanent magnet flux force to the armature member.

A more detailed explanation and illustration of the paths of the flux; the relative values thereof; the variations which may be effected to alter the response of the unit; the manner in which the ringer may be adapted for use with straight line, harmonic or superimposed ringing arrangements; values of the various clapper weights, coil turns, and spring wire sizes; variations in the physical structure of the magnet members; and the response achieved with the various arrangements are set forth in specific detail in the copending application.

It is noted that the novel volume control units of this invention may be successfully employed with modifications of the previous disclosure.

*Volume control units*

The volume control means of the present disclosure are arranged to adjust, by means of a single variable control operation, the effect of the electromagnetic field and the permanent magnet field upon the sound output of the ringer. The volume control means set forth in the copending application disclosed means for incrementally and decrementally adjusting the electromagnetic field effect upon the ringer output which means are also used in the present embodiment. Specifically, a control shaft 60 (Figures 6 and 7) carrying a thumb knob 62 which is accessible to the subscriber at the base of the substation, extends inwardly of the substation set, and an ear-like magnetic shunt vane 64, of soft iron material which is secured to the inward end of the shaft rotates with the shaft in its movement. The shaft is supported by frame 1 and an aperture in flange member 66 (Figure 1) on the lower pole-piece 5.

Flange 30 on upper pole-piece 6 is disposed for cooperation with the rotatable magnetic shunt 64. That is, with rotation of the control shaft, the magnetic shunt 64 will be moved across the flanged portions 66 and 30 of the pole-pieces 5 and 6 respectively in increments proportional to the degree of turn applied to the control shaft to increase the shunting effect for the electromagnetic flux. It should be understood that a degree of shunting of the electromagnetic flux takes place with the shunt member 64 advanced clockwise (Figure 1), but not physically bridging flanges 66 and 30; but that a much greater degree of shunting is effected with shunt 64 physically bridging flanges 66 and 30. As a result of the shunting actions, the available flux for operating the armature is decreased and a proportionately decreased amount of physical energy is transmitted to the clapper to effect a corresponding reduction in the output volume. Adjustment of the shunt 64 to various positions between the positions of full shunt and no shunt of the pole-pieces effects a corresponding adjustment of the magnetic fields, and, in turn, the volume of the sound output of the ringer.

If an air gap, even though small, is maintained between the shunt member 64 and the armature, undue shunting of the permanent magnet flux will be avoided. However, in a preferred embodiment, it was found that shunting of the permanent magnet flux by the electromagnetic shunt vane 64 may be most desirably minimized by maintaining a gap between the vane 64 and the armature which is greater than the sum of the left hand air gap between pole-piece 5 and the armature, and the right hand air gap between the armature and the pole-piece 6.

Figures 2, 3:
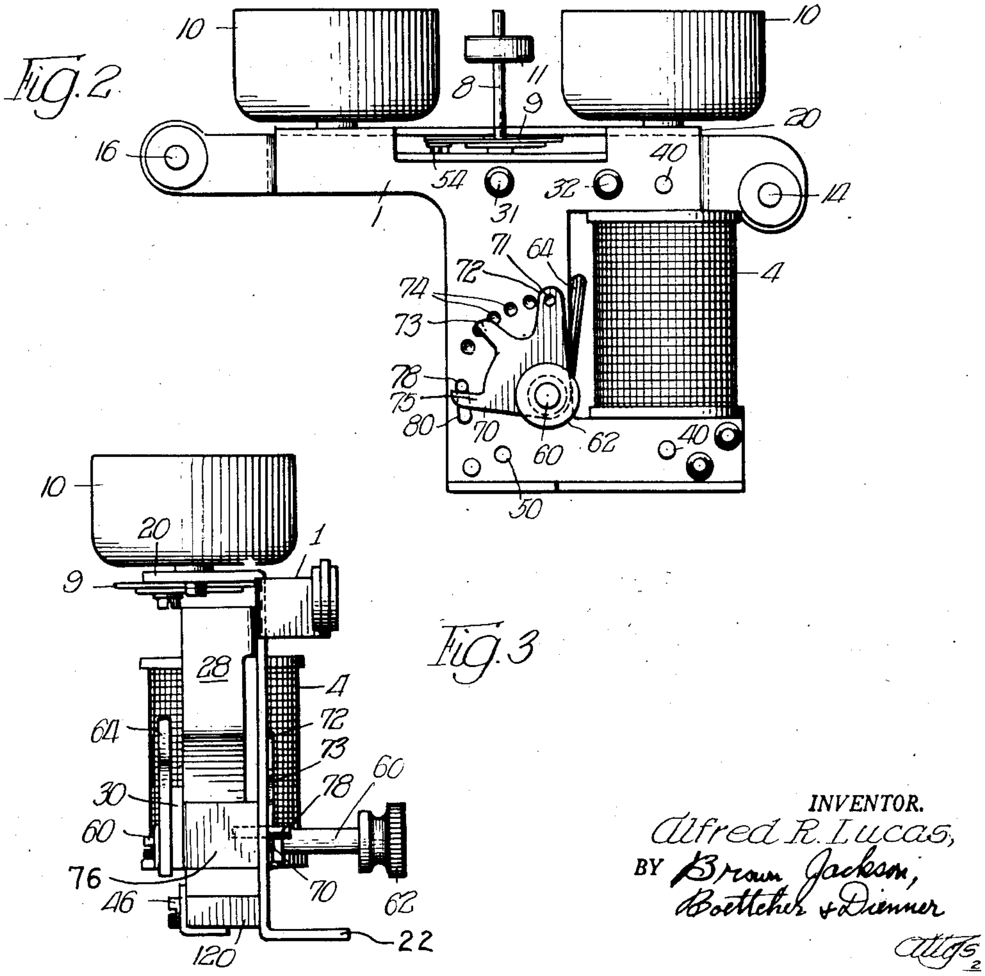
Figure 2 is a rear view of the ringer of Figure 1.
Figure 3 is a right side view of the ringer shown in Figure 1.

Suitable indentations 74 on the back of the frame 1, as illustrated in Figure 2, etc., provide predetermined settings for the control shaft in its rotation between its full shunt and no shunt positions. The number of indentations shown is not critical and can be greater or less in number. In fact, the indentations 74 could be eliminated by strengthening the spring tension on finger 72 and utilizing the friction of boss 71 against frame 1 to maintain the setting of pawl 70. As shown in Figure 2, the pawl like spring member 70 attached to the control shaft 60 mounts a first finger 72 having boss 71 stamped therein, which engages the series of indentations 74 located on the back face of the frame 1.

Thus, with rotation of the knob 62 to adjust the shunt 64 for the electromagnetic field, the boss 71 on flexible pawl spring 70 (which presses the boss 71 toward the frame) restrains the knob 60 in predetermined positions as determined by the indentations 74.

Furthermore pawl member 70 is operative with movement of the control shaft to adjust the effectiveness of the permanent magnet field for the ringer unit.

Specifically, a rectangular shunt member 76, comprised of magnetic material, as particularly shown in Figures 6 and 7, has attached thereto a pin 78 (see Figures 2 and 3) which extends through an elongated aperture 80 in the frame. Shunt member 76 is guided in its movements, and is limited in one of its extreme positions, by this pin-aperture arrangement. The movements of shunt 76 are guided by the slide comprised of frame 1, the armature facing section of pole-piece 6 and the pole-piece flange portion 30, and is limited in its downward movement by the pole-piece extension 120. The magnetic forces of the pole-piece extension, of course, exert attractive forces on the shunt piece 76 uring movement thereof toward pole piece extension 120.

With the volume control in the maximum volume output position (Figures 1, 2 and 6), boss 71 on arm 72 of member 70 (see Figure 2) engages the concavity of the most extreme clockwise indentation. Finger 73 has no function in this position, whereas finger 75 urges pin 78 against the upper end of aperture 80. Referring to Figures 1 and 6 (which show the front of the ringer in the maximum volume output position corresponding to Figure 2), it should be observed that the electromagnetic shunt member 64 is held in its most counterclockwise position (most clockwise with respect to Figure 2) exerting its least shunting influence on the electromagnetic flux which normally passes through the gaps between the armature 7 and the pole-pieces 5 and 6. It should be observed further that the permanent magnet shunt 76 is in its most remotely situated position relative to the pole-piece extension 120, thereby exerting its least shunting effect upon the permanent magnet field flux.

With counterclockwise rotation of the knob 62 ((see Figure 2), finger 75 releases its restraint on pin 78, allowing the magnetic iron shunt 76 to move into the permanent magnet field in such a manner as to reduce the gap in the magnetic circuit between the pole-piece 6 and the pole-piece extension 120 (see Figure 7). As the finger 75 advances in a counterclockwise direction responsive to turning of the knob 62, the response of the shunt 76 in reducing the air gap in the permanent magnetic field causes the pin 78 to follow the finger 75. Simultaneous with this movement of permanent magnet shunt 76 toward pole-piece extension 120, the electramagnetic shunt 64 is advancing across the flange 66 on pole-piece 5 approaching and then connecting with flange 30 on pole-piece 6, thereby offering an alternative flux path to the electromagnetic flux and also a very small portion of the permanent magnet flux.

With sufficient counterclockwise turning of knob 62, the shunt 76 abuts pole-piece extension 120. At this position pin 78 does not quite engage the lower end of aperture 80. Further counterclockwise turning of knob 62 disengages finger 75 from pin 78.

As the knob continues in its counterclockwise movement, boss 71 rides indentations 74, the electromagnetic shunt 64 progressively shunting more and more flux. When the boss 71 rests in the most counterclockwise indentation, finger 75 abuts frame portion 22, and finger 73 nearly touches pin 78. Shunt 64 which is connected thereto is now disposed in its most effective shunting position, and the volume of the ringer is accordingly at its lowest value.

Pin 78 is touching neither the lower end of aperture 80 nor the finger 73. Since the diameter of the pin is less than the width of the aperture, the shunt member may move freely and it accordingly adjusts itself magnetically against the surface of pole-piece extension 120. Due to the angle of the right pole-piece 6, a 5° cut is provided on the pole-piece engaging end of shunt 76 and accordingly a 5° slant is given to aperture 80. This further facilitates the adjustment of shunt 76 against pole-piece extension 120 (see Figures 2, 5 and 8). Stop means such as shown in my aforeidentified copending application may be employed in lieu of the illustrated arrangement. If no stop tabs are used, the engagement of finger 73 with pin 78 as it is moved against the lower end of the slot 80 will act as a limiting arrangement.

It should be observed that if shunt 76 does not move under the influence of the permanent magnet field flux when finger 75 moves out of its way, finger 73 in its counterclockwise movement engages pin 78 to force the attached shunt 76 toward pole-piece extension 120.

With rotation of the control knob 62 in the clockwise direction approaching the situation observed in Figure 2, the electromagnetic shunt 64 is moved away from its bridging position relative to flanges 66 and 30 to reduce the shunt effectiveness provided thereby for the electromagnetic field in corresponding increments, and as the control knob is turned sufficiently to bring the lower finger 75 of pawl member 70 into engagement with pin 78 on the permanent magnetic shunt member 76, further movement of the control knob in the clockwise direction causes the shunt member 76 to be moved away from its abutting position relative to pole-piece extension 120, both shunts moving simultaneously in this volume increasing effect. Continued movement of the knob 62 in the clockwise direction (Figure 2) brings boss 71 into the most clockwise indentation with finger 75 forcing pin 78 into the extreme upper end of aperture 80. Shunt 64 now rests in its original position shown in Figures 1 and 2, and shunt 76 is nested as shown in Figure 6. When control knob 62 is in its extreme clockwise position, shunt 76 and shunt 64 have their minimum effect on the permanent magnetic electromagnetic fields.

It is also seen from the foregoing that the single pawl like member 70 accomplishes four functions, that is, it acts as a pawl or ratchet stop to position the control shaft at given points, it acts as a lever controlling movement of the permanent magnet shunt, it operates as a spring in pulling the shunt 64 toward the pole-piece flanges 66 and 30, and it acts as a stop for shunt 64. Further, the shunting action provided by the members is designed to be the same for each given position of the pawl regardless of the direction of travel of the control knob.

It will be recalled that with the shunting members in their least effective positions (Figure 1, for example) the electromagnetic flux path includes pole-piece 5, the left hand air gap, armature 7, the right hand air gap and pole-piece 6, and the laminations of core 3 interconnecting the pole-pieces 5 and 6 respectively. However, with movement of the shunting member 64 toward flange 30, but short of contact therewith, a significant portion of the electromagnetic flux traverses the following shunting paths, pole-piece 5, through flange 66, over shunt 64 and thence in two directions, a portion of the flux passing over the edge of the armature and through the right hand air gap to the facing surface of pole-piece 6, and another portion passing over the air gap between 64 and flange 30. As shunt 64 is moved into contact with the flange 30 the flux traverses the path which extends from flange 66 of pole-piece 5 over shunt member 64 to flange 30 of pole-piece 6. The shunting paths thus provided for the electromagnetic flux decrease the effective operating values for the armature 7 and accordingly decreases the output volume of the ringer.

In the case of the flux provided by the permanent magnet, it will be recalled that the polarizing flux paths are as follows:

(Assuming the left pole of magnet 2 to be of north polarity)—

(*a*) North pole of magnet 2, pole-piece 5, left hand air gap, armature 7, pivot of armature 7, groove 42, pole-piece extension 120, and the south pole of magnet 2;

(*b*) North pole of magnet 2, pole-piece 5, core 3, pole-piece 6, right hand air gap, armature 7, pivot of armature 7, groove 42, and the pole-piece extension 120 to the south pole of magnet 2.

As the permanent magnet flux shunting member 76 is moved into one of its shunting positions, a corresponding portion of the permanent magnet flux will be extended from the north pole of magnet 2, over pole-piece 5, core 3, pole-piece 6, shunt member 76 and pole-piece extension 120 to the south pole of magnet 2. A corresponding reduction in the flow of permanent magnet flux over the armature is experienced and a corresponding reduction in the output value is accomplished.

*Rectilinear control means*

In a further embodiment, the control arrangement accessible to the subscriber comprises a manual control member which is moved in a rectilinear fashion rather than in the rotative manner illustrated in Figures 1–7. Such arrangement which includes a linkage arm, as shown in Figures 8, 9 and 10, is adapted to operate the elements of Figures 1–7 responsive to rectilinear movement of a control member 90.

Specifically, the linkage comprises a substantially T-shaped member 82 having arms 134 and 135 which are partially guided in their movement by a protrusion on frame 1, such as 84, and a guide pin 85 which is of magnetic material and is inserted through registering holes in pole-piece 6 and frame 1. The body of the T-member 82 is maintained in spaced relationship to the frame 1 by an extruded section 86. A tab member 135 on the upper end of T-member 82 engages a cooperative slot 132 on a frame protrusion 133. With application of a rectilinear force to a handle 90 (which would be located at the base and outside of the substation housing), the T-member 82 will be moved sideways in an obvious manner.

The base of the T-member is of a two-tooth fork shaped configuration, as shown at 92, the tines of which are located on either side of a rearwardly protruding stud member 94 fixedly attached to a link 96. The ringer is adjusted to provide maximum volume output of the ringer system when stud member 94 is disposed in the crotch of the tines of fork 92 (as shown in Figure 8), and minimum volume output when moved to the position shown in Figure 9. It will be apparent that with the exertion of a lateral force to the left on the rearwardly protruding handle 90, the upper arms of the link 82 will cause the T-member link to move laterally of the frame, and the forked arms will exert lateral pressure upon the pin 94 and cause same to ride downwardly in the slot of the fork, whereby rotative movement will be imparted over link 96 to the shaft 60, and in turn to pawl member 70 by means of a shoulder (not shown) on shaft 60 which cooperates with the corresponding aperture in pawl member 70. Twisting movement of the tine end of the link 82 is further restrained by its connection to link 96 and pin 94.

With rotative movement of the shaft 60 and the finger carrying member 70 to its various positions, the shunting members 64 and 76 are rendered effective and ineffective in the manner previously described herein.

*Adjustment of electromagnetic and permanent magnet fields with single shunt member*

In a further embodiment of the invention, adjustment of the volume output of the ringer is effected through the adjustment of the position of a single shunt member relative to the electromagnetic and permanent magnet fields.

Specifically, as best shown in Figure 13, the structure of Figures 1–10 is modified by providing a pole-piece extension 120 which is of such width as to locate its outer face in a common plane with the outer face of the flange 30. Thus, with movement of the supporting shaft 60, the single shunt member 64 may be moved into various positions as shown in Figures 11 and 12, to independently vary, simultaneously or separately, the degree of influence of both the permanent magnet and the electromagnetic fields.

More specifically, with reference to Figure 11, the shunt 64 as shown in solid lines therein, is disposed in a position which effects minimum influence upon the electromagnetic and permanent magnet fields. With clockwise rotation of the shunt toward the second position shown in Figure 11 (illustrated in dotted lines therein), a proportionate increase in the shunting of the electromagnetic field is effected, and as the illustrated position is attained, full shunting of the electromagnetic field and a slight shunting of the permanent magnet field is provided. It is, of course, apparent that varying degrees of influence are exerted upon the electromagnetic field by the shunt with movement thereof between the first and second illustrated positions, and therefore a corresponding variation in the volume output of the ringer is accomplished.

With movement of the shunt toward the third illustrated position (the position illustrated in dotted lines in Figure 12), shunting of the permanent magnetic field is increased and full shunting of the electromagnetic field is maintained. An increased shunting of both fields is accomplished by the shunt with the progressive movement thereof between the second and third illustrated positions and a corresponding reduction in the volume output of the ringer is effected. As the position illustrated in dotted lines in Figure 12 is reached, the volume output of the ringer will be at a minimum.

With movement of the shunt member toward the fourth illustrated position (if such is desired), the shunting effect upon the electromagnetic field is correspondingly reduced and full shunting of the permanent magnetic field is maintained. As the fourth position is reached the permanent magnetic field is fully shunted, and a small amount of shunting of the electromagnetic field is achieved.

Summarily, the single shunt member of this embodiment is operative to accomplished (*a*) no shunting of the electromagnetic and permanent magnet fields; (*b*) minimum to maximum shunting of the electromagnetic field with little effect upon the permanent magnet field; (*c*) full shunting of the electromagnetic field and incremental shunting of the permanent magnet field from a minimum to a maximum shunting value; (*d*) maximum shunting of the permanent magnet field and incremental shunting of the electromagnetic field from a maximum to a minimum value.

The embodiment utilizing the single shunt member is readily adaptable for use with either of the two linkages disclosed in the several figures hereinbefore; that is, the linkage operated by a rotative movement or the linkage operated by rectilinear movement of a controlling member.

It is apparent from the foregoing description that a single shunt member may be provided to perform the several shunting functions of the several shunt members employed in Figures 1–7 without sacrifice of versatility in operation, and at a reduced cost in manufacture.

While there has been described what is regarded to be preferred embodiments of the invention, it will be apparent that various changes, rearrangements and modifications may be made therein without departing from the scope of the invention as defined by the appended claims.

What is claimed is:

1. In a telephone ringer structure having magnetic field responsive components including at least a movable armature, means for applying an electromagnetic field to said components and means for applying a permanent magnetic field to said components, a first means operative to various positions to adjust the degree of effectiveness of the electromagnetic field relative to said components, a second means operative to adjust the degree of effectiveness of the permanent magnetic field relative to said components, and common control means adjustable through a given pattern including means operable with movement of the control means through a given portion of the travel thereof to effect an initial movement of said first and second means and a corresponding variation of the degree of influence of the elecetromagnetic and permanent magnetic fields relative to said components, and operable with further travel thereof to effect further incremental movement of said first means and a corresponding increase in shunting of the electromagnetic field relative to said components.

2. In a telephone ringer structure having magnetic field responsive components including at least a movable armature, means for producing an electromagnetic field and a permanent magnetic field for energizing said components, a first shunt means operative to vary the effectiveness of the electromagnetic field, a second shunt means operative to adjust the effectiveness of the permanent magnetic field, and common control means for adjusting said first and said second means in the control of the electromagnetic and permanent magnetic fields comprising a finger-carrying pawl member, means positioned adjacent a first pawl finger for determining therewith the operating positions for said control means, and means on said second shunt means disposed to permit movement of said second shunt means by finger means on said pawl member in the adjustment of the influence of the permanent magnetic field on said components.

3. In a telephone ringer structure having magnetic field responsive components including at least a movable armature, means for providing an electromagnetic field and a permanent magnetic field for energizing said components, a first shunt means operative to vary the effectiveness of the electromagnetic field, a second shunt means operative to adjust the effectiveness of the permanent magnetic field, and common control means for adjusting said first and said second means in the control of the electromagnetic and permanent magnetic fields including a finger-carrying pawl member, a control shaft for supporting said first shunt means and said pawl member, means positioned adjacent a first finger on said pawl member for determining therewith the operating positions for said control means, means on said second shunt member disposed to permit operation of said shunt to various positions by finger means on said pawl members so as to vary the influence of the permanent magnetic field on said components, and means including said pawl member and said common support shaft for maintaining said shunt member for said electromagnetic field in close abutting relation to said electromagnetic field producing members.

References Cited in the file of this patent

UNITED STATES PATENTS

| | | |
|---|---|---|
| 142,486 | Little | Sept. 2, 1873 |
| 1,106,655 | Kaisling | Aug. 11, 1914 |
| 2,165,123 | Ballantine | July 4, 1939 |
| 2,333,230 | Beechlyn | Nov. 2, 1943 |
| 2,442,016 | Poole | May 25, 1948 |
| 2,659,073 | Wiesman | Nov. 10, 1953 |

FOREIGN PATENTS

| | | |
|---|---|---|
| 554,439 | Germany | July 8, 1932 |